(12) United States Patent
An et al.

(10) Patent No.: US 12,500,731 B2
(45) Date of Patent: Dec. 16, 2025

(54) SENSING SYSTEM, METHOD FOR OBTAINING WORKING CLOCK SIGNAL, INTEGRATED CIRCUIT, RADIO DEVICE, AND DEVICE

(71) Applicant: CALTERAH SEMICONDUCTOR TECHNOLOGY (SHANGHAI) CO., LTD., Shanghai (CN)

(72) Inventors: Fazhi An, Shanghai (CN); Yafei Shi, Shanghai (CN); Wenting Zhou, Shanghai (CN); Tao Gong, Shanghai (CN)

(73) Assignee: Calterah Semiconductor Technology (Shanghai) Co., Ltd., Shanghai (CN)

( * ) Notice: Subject to any disclaimer, the term of this patent is extended or adjusted under 35 U.S.C. 154(b) by 108 days.

(21) Appl. No.: 18/473,403

(22) Filed: Sep. 25, 2023

(65) Prior Publication Data

US 2024/0015001 A1    Jan. 11, 2024

Related U.S. Application Data

(63) Continuation of application No. PCT/CN2021/082306, filed on Mar. 23, 2021.

(30) Foreign Application Priority Data

Mar. 23, 2021    (CN) .......................... 202110316890.7

(51) Int. Cl.
*H04L 7/033* (2006.01)
*G06F 1/10* (2006.01)

(52) U.S. Cl.
CPC .............. *H04L 7/0331* (2013.01); *G06F 1/10* (2013.01)

(58) Field of Classification Search
CPC ................................ H04L 7/0331; G06F 1/10
See application file for complete search history.

(56) References Cited

U.S. PATENT DOCUMENTS 6,204,713 B1    3/2001    Adams et al.
10,509,104 B1 *    12/2019    Dato ....................... G01S 13/87
(Continued)

FOREIGN PATENT DOCUMENTS

CN    106776426 A    5/2017
CN    106992770 A    7/2017
(Continued)

OTHER PUBLICATIONS

Calterah Semiconductor Technology (shanghai) Co.,Ltd., CN First Office Action with English translation, CN 2021103168907, Aug. 2, 2022, 18 pgs.
(Continued)

*Primary Examiner* — David B Lugo
(74) *Attorney, Agent, or Firm* — USCH Law, PC

(57) ABSTRACT

The sensing system includes at least one chip branch. In the chip branch, a clock circuit of each sensing chip integrates the received working clock signal to obtain stable clock signal that has a relative high frequency to be subjected to frequency dividing, and a frequency dividing circuit performs frequency dividing processing on the clock signal to obtain a working clock signal required by a next-stage sensing chip. In the cascade structure, a clock source only needs to satisfy the driving requirement of a first-stage sensing chip, and the working clock signal required by each of other sensing chips is provided by a previous-stage sensing chip, such that the problem that the number of sensing chips connected in series in the chip branch is
(Continued)

limited by the driving capability of the clock source is solved, and the applicability of the sensing system is widened.

20 Claims, 6 Drawing Sheets

(56) References Cited

U.S. PATENT DOCUMENTS

| | | | |
|---|---|---|---|
| 2003/0020529 A1* | 1/2003 | Nakanishi | H03K 5/1506 |
| | | | 327/295 |
| 2014/0070865 A1 | 3/2014 | Fortier et al. | |
| 2018/0175868 A1* | 6/2018 | Stuhlberger | H03L 7/0814 |
| 2018/0267165 A1 | 9/2018 | Steinbuch et al. | |
| 2019/0107427 A1 | 4/2019 | Waelde et al. | |
| 2019/0178983 A1 | 6/2019 | Lin et al. | |
| 2019/0386665 A1 | 12/2019 | Shalita et al. | |
| 2020/0386601 A1 | 12/2020 | Waelde et al. | |

FOREIGN PATENT DOCUMENTS

| | | |
|---|---|---|
| CN | 109031331 A | 12/2018 |
| CN | 109991604 A | 7/2019 |
| CN | 110958018 A | 4/2020 |
| CN | 113055000 A | 6/2021 |

OTHER PUBLICATIONS

Calterah Semiconductor Technology (shanghai) Co.,Ltd., International Search Report with English translation, PCT/CN2021/082306, Dec. 23, 2021, 5 pgs.

Calterah Semiconductor Technology (shanghai) Co., Ltd., Extended European Search Report, EP 21932066.0, May 7, 2024, 9 pgs.

* cited by examiner

SENSING SYSTEM, METHOD FOR OBTAINING WORKING CLOCK SIGNAL, INTEGRATED CIRCUIT, RADIO DEVICE, AND DEVICE

CROSS REFERENCE TO RELATED APPLICATIONS

The present application is a continuation of PCT Patent Application No. PCT/CN2021/082306, filed Mar. 23, 2021, which claims priority to Chinese Patent Application No. CN202110316890.7, entitled "SENSING SYSTEM, RELATED APPARATUS, AND METHOD FOR OBTAINING WORKING CLOCK SIGNAL," filed on Mar. 23, 2021, each of which is incorporated by reference herein in its entirety.

TECHNICAL FIELD

The present disclosure relates to the technical field of sensing, and in particular to a sensing system, a method for obtaining working clock signal, an integrated circuit, a radio device, and a device.

BACKGROUND

In the design of sensing chips, considering the degree of integration, it is impossible to integrate too many receiving and transmitting channels in a single chip, so sometimes it cannot meet the requirements for angle resolution and detection distance in some high requirement application scenarios. In this case, it is usually necessary to use multiple sensing chips in a cascading manner.

However, currently, in response to multiple sensing chips (e.g., radar chips) being used in combination by cascading, due to the limitation of the driving ability of the clock source, the number of sensing chips that can be cascaded is limited, so that the applicability of the cascaded sensing system still poor.

SUMMARY

In order to solve the above technical problems, a sensing system, a method for obtaining working clock signal, an integrated circuit, a radio device, and a device are provided according to the present disclosure, to solve the problem of the number of cascaded sensing chips being limited by the clock source driving ability.

In order to achieve the above technical objects, the embodiments of the present disclosure provide the following technical solutions.

A sensing system includes:

at least one chip branch, where each of the at least one chip branch includes N sensing chips connected sequentially to form N cascading stages, N being an integer greater than one;

where each of the N sensing chips includes a clock circuit and a frequency dividing circuit, the clock circuit is configured to receive an input working clock signal, and to perform an integration process on the input working clock signal to obtain an intermediate clock signal;

the frequency dividing circuit is configured to receive the intermediate clock signal, and to perform a frequency dividing process on the intermediate clock signal to obtain an output working clock signal;

the input working clock signal received by the clock circuit of a first-stage sensing chip includes a first working clock signal received by the at least one chip branch, the input working clock signal received by the clock circuit of an ith-stage sensing chip is the output working clock signal output by the frequency dividing circuit of an (i−1) th-stage sensing chip, i being an integer greater than one and less or equal to N.

In some embodiments, each of the at least one chip branch includes one type of sensing chips. In each of the N sensing chips, the working clock signal output by the frequency dividing circuit and the working clock signal received by the clock circuit are homologous clock signals.

In some embodiments, each of the at least one chip branch includes at least two types of sensing chips.

In some embodiments, in each of the at least one chip branch, the number of jth-stage sensing chips is greater than or equal to 1.

In some embodiments, the clock circuit of each of the N sensing chips is configured to output a same intermediate clock signal or different clock signals to be divided.

In some embodiments, the clock circuit includes a phase-locked loop.

In some embodiments, the phase-locked loop is configured to receive the working clock signal, process the working clock signal to generate four phase clock signals, determine one of the four phase clock signals with a same phase as the working clock signal as the intermediate clock signal, and determine the other three of the four phase clock signals as backup clock signals.

In some embodiments, the frequency dividing circuit is configured to continuously divide the intermediate clock signal from 1 to M to obtain multiple backup clocks with different frequencies, and determine the working clock signal output by the frequency dividing circuit from multiple backup clocks based on the clock signal frequency required by the next-stage sensing chip, M being an integer greater than 1.

In some embodiments, the N sensing chips of each of the at least one chip branch includes one master sensing chip and at least one slave sensing chip.

In some embodiments, the master sensing chip is configured to receive an enable signal, generate a control signal based on the enable signal, and transmit the control signal to a next-stage slave sensing chip through a data channel. Each of the at least one slave sensing chip is configured to receive the control signal, operate based on the control signal, and transmit the control signal to the next-stage slave sensing chip through the data channel.

In some embodiments, each of the N sensing chips further includes: a digital function module and an operation control device, the digital function module is communicatively connected to the operation control device, the clock circuit, and the frequency dividing circuit, respectively. The digital function module is configured to detect whether the clock circuit and the frequency dividing circuit are abnormal or not, and the operation control device is configured to control the digital function module to operate.

In some embodiments, each of the N sensing chips is a millimeter wave sensing chip, and/or the intermediate clock signal has greater frequency than the working clock signal.

It should be noted that in the at least one chip branch in the embodiments of the present disclosure, the sensing chip (or integrated circuit) serves as an intermediate node can be reused as the already integrated phase-locked loop of the main body to achieve clock synchronization between each sensing chip, or a phase-locked loop can be additionally set to achieve clock synchronization between each sensing chip, which can be set according to actual needs. In addition, in response to a phase-locked loop being separately arranged to achieve clock synchronization between various sensing chips, the sensing chips at the end nodes of each cascaded branch do not need to output a reference clock for the next-stage sensing chip, and there is also no need to arrange a phase-locked loop structure and/or frequency dividing circuit for clock synchronization.

Moreover, for any sensing chip or integrated circuit provided with a clock circuit and a frequency dividing circuit, in the sensing chip or the integrated circuit, the clock circuit and frequency dividing circuit can be integrated into a phase-locked loop, that is, the frequency dividing circuit can be a frequency divider in the phase-locked loop, or a phase-locked loop can be used as a clock circuit, and a frequency divider can be used as the above frequency dividing circuit. That is, there is a frequency divider in the phase-locked loop that is used to implement the function of the phase-locked loop, while a frequency divider arranged outside the phase-locked loop can be used to divide the output of the phase-locked loop to obtain the output working clock signal.

In an optional embodiment, the phase-locked loop in the traditional sensing chip can be reused as the clock circuit, and a frequency divider can be added to receive the output of the reused phase-locked loop for frequency dividing to obtain the working clock of the next level sensing chip.

In addition, in the same cascaded branch, the transmitting channel and the receiving channel between each sensing chip may be different, and the sensing chip serving as an intermediate node can also be connected to at least two sensing chips in parallel. For example, the sensing chips can be used to form a cascade architecture in the form of a tree. In the embodiments of the present disclosure, for the cascade sensing system, there is no need to limit the types of sensing chips and the cascade forms between them, as long as they can achieve clock synchronization between each other.

A method for obtaining a working clock signal based on any of the sensing systems described above, where the sensing system includes at least one chip branch, and each of the at least one chip branch includes N sensing chips connected sequentially. N is greater than one. The method for obtaining the working clock signal includes:
  obtaining a working clock signal;
  performing integration process on the working clock signal to obtain an intermediate clock signal;
  performing frequency dividing process on the intermediate clock signal to obtain the output working clock signal.

An integrated circuit is further provided according to the embodiments of the present disclosure, and the integrated circuit includes a clock circuit and a frequency dividing circuit. The clock circuit is configured to receive an input working clock signal, and to perform an integration process on the working clock signal to obtain an intermediate clock signal. The frequency dividing circuit is configured to receive the intermediate clock signal, and to perform a frequency dividing process on the intermediate clock signal to obtain an output working clock signal.

In some embodiments, the working clock signal received by the clock circuit of a first stage of the integrated circuit in the cascaded branch includes an external working clock signal. A working clock signal received by the clock circuit of an ith-stage of the integrated circuit is the working clock signal output by the frequency dividing circuit of an (i−1)th-stage of the integrated circuit, with i being greater than one.

In some embodiments, the frequency dividing circuit is further configured to receive the intermediate clock signal, and obtain at least one frequency dividing clock signal for the integrated circuit to transmit and receive signals and/or signal processing and/or data processing after the intermediate clock signal is divided in frequency.

In some embodiments, the integrated circuit includes a phase-locked loop, and the clock circuit and/or the frequency dividing circuit are integrated into the phase-locked loop.

In some embodiments, the integrated circuit is an antenna in package (AiP) structure and/or an antenna on chip (AoC) structure.

A radio device includes:
  a carrier;
  a sensing system or an integrated circuit, where the sensing system is the sensing system according to any one of above embodiments, the integrated circuit is the integrated circuit according to any one of above embodiments, and the sensing system includes sensing chips arranged on the carrier; and
  an antenna, where the antenna is arranged on the carrier or integrated with the sensing chip or the integrated circuit to be arranged on the carrier;
  where the sensing chip or the integrated circuit is connected to the antenna to receive and transmit radio signals.

A device, includes:
  a device main body; and
  a radio device, where the radio device is the radio device according to any one of above embodiments, and is arranged on the device main body;
  where the radio device is configured to perform object detection and/or communication.

It can be seen from the above technical solution that a sensing system, a method for obtaining a working clock signal, an integrated circuit, a radio device, and a device are provided according to the embodiments of the present disclosure. The sensing system includes at least one chip branch, and each of the at least one chip branch includes N sensing chips connected sequentially. In the chip branch, the clock circuit of each of the N sensing chips is configured to integrate the received working clock signal, to obtain a stable and relatively high frequency intermediate clock signal. The frequency dividing circuit is configured to divide the clock signal to obtain the working clock signal required for the next-stage sensing chip. In the cascaded structure, the clock source only needs to provide the working clock signal of the first-stage sensing chip, which meets the driving requirements of the first-stage sensing chip. The working clock signal required by other sensing chips is provided by an upper-stage sensing chip, which solves the problem of the number of sensing chips connected in series in the chip branch being limited by the driving ability of the clock source, and expands the applicability of the sensing system.

Moreover, in the chip branch of the sensing system, the placement and wiring of the connected sequentially sensing chips are not limited by the location of the clock source, which is beneficial for improving the design flexibility of the sensing system and simplifying the difficulty of the sensor system layout.

BRIEF DESCRIPTION OF THE DRAWINGS

For more clearly illustrating embodiments of the present disclosure or the technical solutions in the conventional technology, drawings referred to for describing the embodiments or the conventional technology will be briefly described hereinafter. Apparently, drawings in the following description are only examples of the present disclosure, and for the person skilled in the art, other drawings may be acquired based on the provided drawings without any creative efforts.

DETAILED DESCRIPTION

Figure 1:
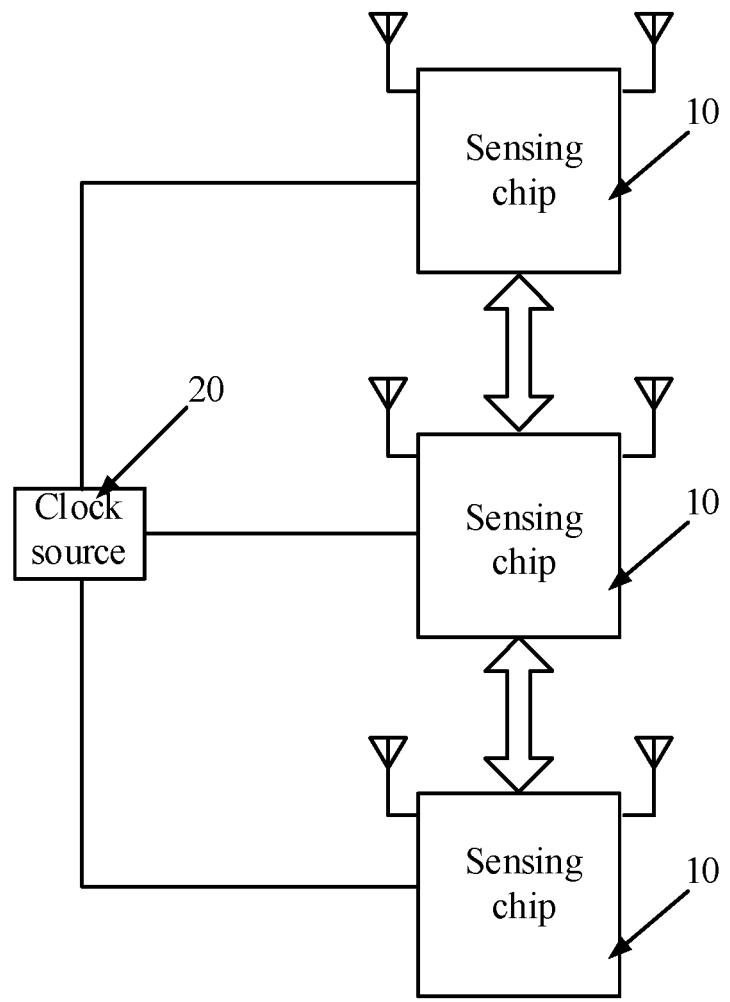
FIG. 1 is a schematic structural view of a cascade solution in the conventional art.

As described in the background technology, in order to improve the angular resolution and maximum detection distance of the sensing system, it is necessary to use multiple sensing chips in a cascading manner. For example, three sensing chips with a single transmitter and a single receiver can be cascaded together to work simultaneously, to achieve the equivalent effect of three transmitters and three receivers. The sensing chip cascade solution in the conventional art is shown in FIG. 1, which is based on a clock source 20 to provide working clock signals for multiple sensing chips 10. This scheme can generate stable working clock signals for multiple sensing chips 10 to use together. However, due to the driving ability of the single clock source 20, the number of sensing chips 10 in this cascade solution is greatly limited. The sensing system that simultaneously shares the clock source 20 greatly restricts the placement of multiple sensing chips 10 on the printed circuit board (PCB). In addition, the interconnecting wiring between multiple sensing chips 10 becomes more complex and cumbersome, thereby increasing the difficulty of designing and arranging the sensing system.

In view of this, a sensing system is provided according to the embodiments of the present disclosure, the sensing system includes at least one chip branch, and each of the at least one chip branch includes N sensing chips connected sequentially. In the chip branch, the clock circuit of each of the N sensing chips is configured to integrate the received working clock signal, to obtain a stable and relatively high frequency intermediate clock signal. The frequency dividing circuit is configured to divide the clock signal to obtain the working clock signal required for the next-stage sensing chip. In the cascaded structure, the clock source only needs to provide the working clock signal of the first-stage sensing chip, which meets the driving requirements of the first-stage sensing chip. The working clock signal required by other sensing chips is provided by an upper-stage sensing chip, which solves the problem of the number of sensing chips connected in series in the chip branch being limited by the driving ability of the clock source, and expands the applicability of the sensing system.

Moreover, in the chip branch of the sensing system, the placement and wiring of the connected sequentially sensing chips are not limited by the location of the clock source, which is conducive to improving the design flexibility of the sensing system and simplifying the layout difficulty of the sensing system.

The following will provide a clear and complete description of the technical solution in the embodiments of the present disclosure in conjunction with the accompanying drawings. Obviously, the described embodiments are only a part of the embodiments of the present disclosure, not all of them. Based on the embodiments in the present disclosure, all other embodiments obtained by ordinary technical personnel in this field without creative labor shall fall within the scope of protection in the present disclosure.

Figure 2:
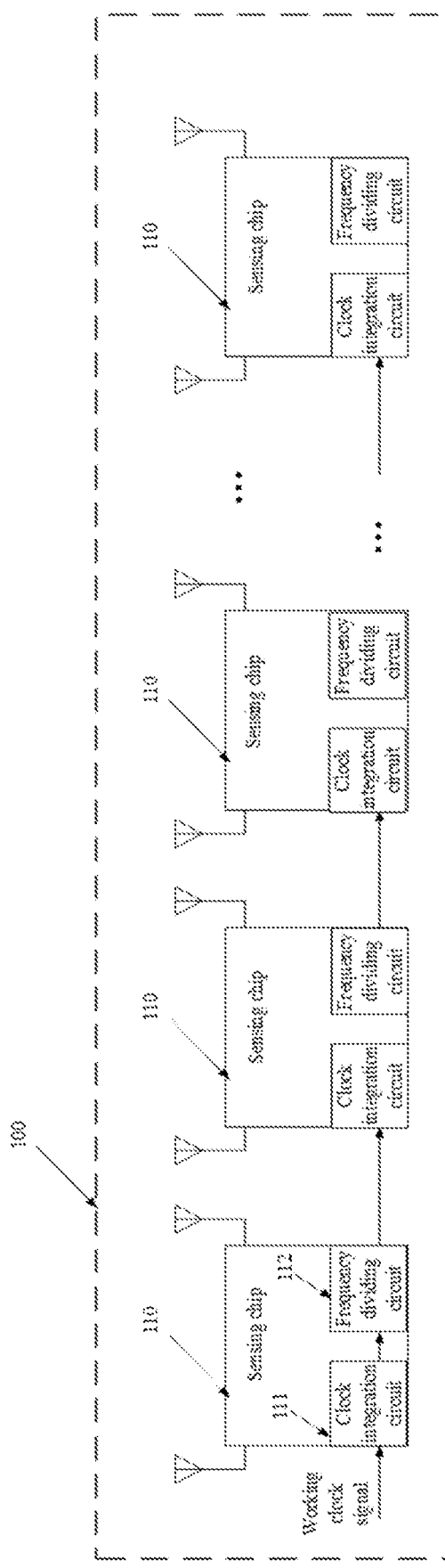
FIG. 2 is a schematic structural view of a sensing system provided according to an embodiment of the present disclosure.
Figure 3:
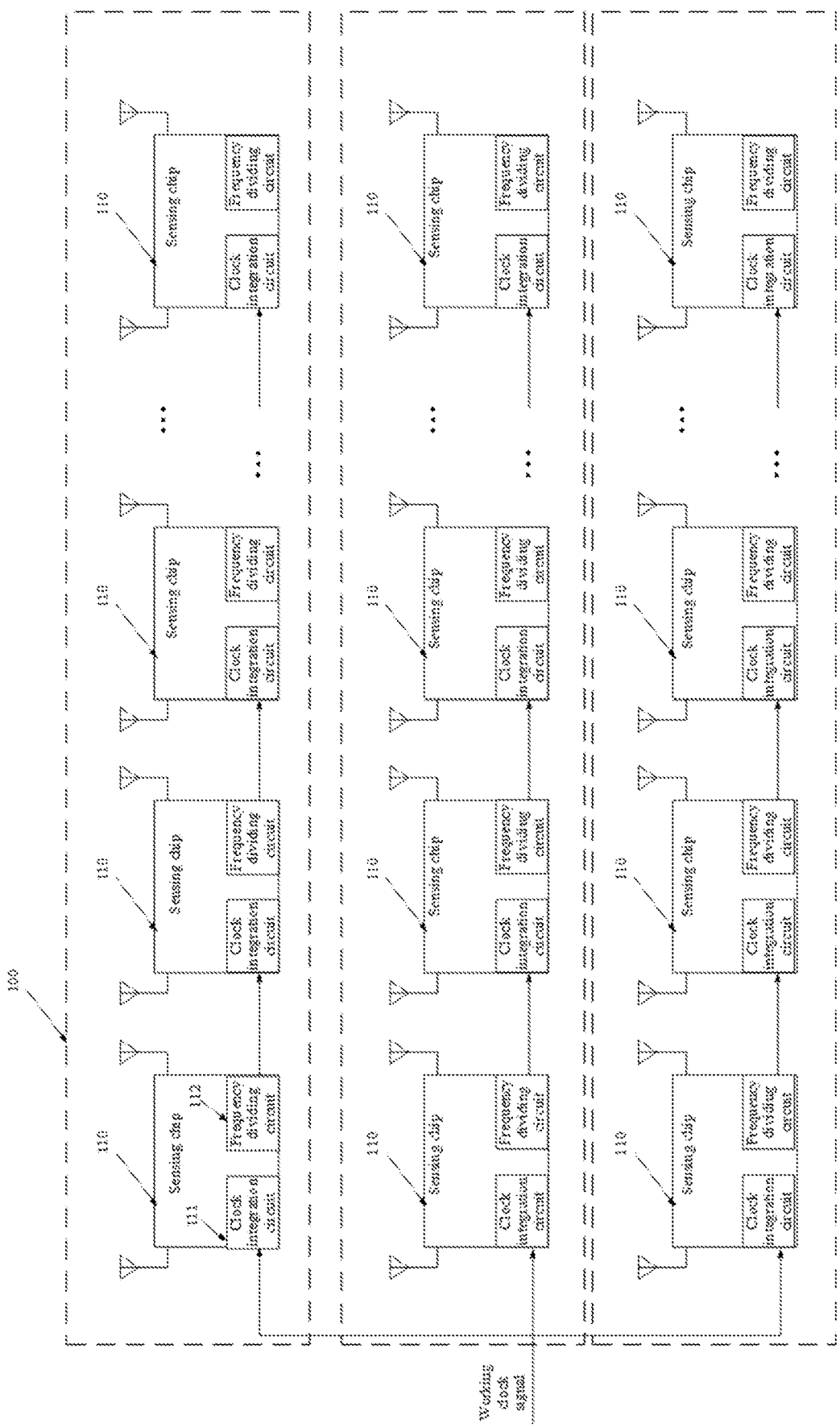
FIG. 3 is a schematic structural view of a sensing system provided according to another embodiment of the present disclosure.

The present disclosure embodiment provides a sensing system, as shown in FIG. 2 and FIG. 3, the sensing system includes at least one chip branch, where each of the at least one chip branch includes N sensing chips connected sequentially to form N cascading stages, and N is an integer greater than one.

Each of the N sensing chips includes a clock circuit and a frequency dividing circuit, the clock circuit is configured to receive an input working clock signal, and to perform an integration process on the input working clock signal to obtain an intermediate clock signal.

The frequency dividing circuit is configured to receive the intermediate clock signal, and to perform a frequency dividing process on the intermediate clock signal to obtain an output working clock signal. The input working clock signal received by the clock circuit of a first-stage sensing chip comprises a first working clock signal received by the at least one chip branch, the input working clock signal received by the clock circuit of an ith-stage sensing chip is the output working clock signal output by the frequency dividing circuit of an (i−1)th-stage sensing chip, i is an integer greater than one and less or equal to N.

The clock circuit 111 and the frequency dividing circuit 112 are both existing receivers in each of the N sensing chips 110. In one chip branch 100, except for the working clock signal received by the first stage sensing chip 110, which is input from the outside, the working clock signal received by the other sensing chips 110 is provided by the upper stage sensing chip 110. The working clock signal input from the outside can be provided by a clock source such as an oscillator.

The working clock signal received by the sensing chip 110 is not only provided to the clock circuit 111, but also to other structures of the sensing chip 110 to meet the working requirements of these structures.

In the sensing chip 110, in response to the clock circuit 111 receiving the working clock signal, it is integrated and processed to improve the driving ability of the working clock signal (by increasing the frequency of the working clock chip, e.g., increasing the working clock signal to 400 MHz), and then the frequency dividing circuit 112 perform the frequency dividing process on the working clock signal to obtain the working clock signal of the required frequency for the next-stage sensing chip 110.

For example, for the 77 GHz sensing chip 110, the required working clock signal is 50 MHz. Therefore, the frequency dividing circuit 112 of the upper-stage sensing chip 110 is configured to divide 400 MHz eight times, to obtain a 50 MHz working clock signal for the 77 GHz sensing chip 110. For the 60 GHz sensing chip 110, the required working clock signal is 40 MHz. Therefore, the frequency dividing circuit 112 of the upper-stage sensing chip 110 performs frequency dividing process ten times on 400 MHz to obtain a 40 MHz working clock signal for the 60 GHz sensing chip 110.

It should be noted that the phase of the intermediate clock signal output by the clock circuit 111 generally needs to be the same as the phase of the input working clock signal. Therefore, the phase of the output working clock signal obtained after the intermediate clock signal is divided by the frequency dividing circuit 112 is also the same as the phase of the input working clock signal. Of course, in response to the phase of the required working clock signal being different between a sensing chip 110 and an upper-stage sensing chip 110, the phase of the intermediate clock signal output by the clock circuit 111 can also be different from the phase of the input working clock signal, so that the phase of the output working clock signal obtained after the intermediate clock signal is divided by the frequency dividing circuit 112 is different from the phase of the input working clock signal, which depends on the actual situation, and is not limited thereto the present disclosure.

In addition, the clock circuit 111 is configured to output clock signals of other phases as backup in addition to the intermediate clock signal. Correspondingly, in response to dividing the intermediate clock signal, the frequency dividing circuit 112 not only obtains the working clock signal required by the next-stage sensing chip 110, but also continuously divides the clock signal from one division to M division, to obtain multiple clock signals. Except for outputting the clock signal required by the next level sensing chip 110 as the working clock signal, all other clock signals can be used as backup, and M is a positive integer greater than 1, such as 127. The frequency dividing circuit 112 is specifically configured to continuously divide the intermediate clock signal from 1 to M to obtain multiple backup clock signals with different frequencies. Based on the clock signal frequency required by the next-stage sensing chip 110, the working clock signal output by the frequency dividing circuit 112 is determined from the multiple backup clock signals.

In FIG. 2, the sensing system includes a chip branch 100, and each chip branch 100 includes N sensing chips 110 connected sequentially. The value of N can be any integer greater than 1, such as 2, 3, 4, 5, 6, etc. The specific value can be determined according to actual needs.

In FIG. 3, the sensing system includes three chip branches 100, similarly, each chip cascaded branch 100 includes N sensing chips 110 connected sequentially. In FIG. 2 and FIG. 3, the working clock signal received by the first stage sensing chip 110 of each chip branch 100 is provided by an external clock source of the sensing chip 110, which may be an oscillator or the like, which is not limited thereto the present disclosure.

It is not difficult to understand that FIG. 2 and FIG. 3 show the case where there are one and three chip branches 100, respectively. In other embodiments of the present disclosure, the number of chip branches 100 in the sensing system may be 2, 4, 5, etc. However, it should be noted that the number of chip branches 100 still needs to be limited by the driving ability of the clock source, as the number of chip branches 100 increases, the first stage sensing chip 110 of each chip branch 100 still requires a clock source to provide a working clock signal for driving.

Figure 4:
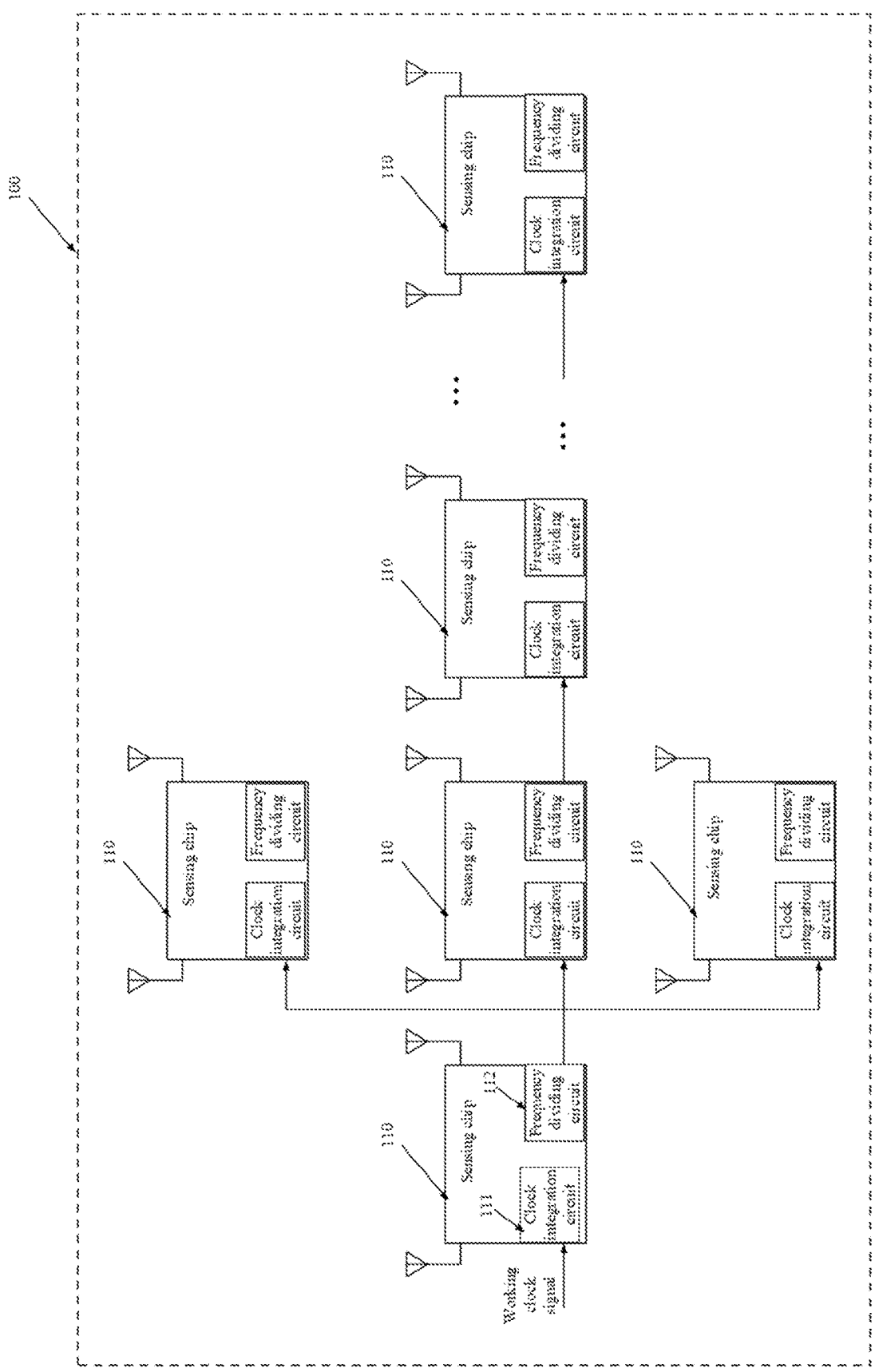
FIG. 4 is a schematic structural view of a sensing system provided according to yet another embodiment of the present disclosure.

In addition, referring to FIG. 4, in an optional embodiment of the present disclosure, in one of the chip branches 100, the number of jth-stage sensing chips 110 may not only be 1, may also be 2, 3, 4, etc., which depends on the driving ability of the working clock signal output by the sensing chip 110 and actual requirements. And, j is a positive integer greater than 1, which can further expand the number of sensing chips 110 that can be cascaded in each chip branch 100 of the sensing system, and further expand the applicability of the sensing system.

For the type of sensing chip 110 in the sensing system or the chip branch 100, optionally, in an embodiment of the present disclosure, the type of sensing chip 110 in the chip branch 100 is the same. For example, they may all be a sensing chip 110 with a single transmitter and a single receiver, or may all be a sensing chip 110 with two transmitters and two receivers, or may all be a sensing chip 110 with a single transmitter and two receivers.

In the sensing chip 110, the working clock signal output by the frequency dividing circuit 112 and the working clock signal received by the clock circuit 111 are homologous clock signals.

Due to the same type of sensing chips 110 in the cascaded branch 100 in the sensing system, the working clock signals received and output by each sensing chip 110 are all homologous clock signals to meet the working requirements of each sensing chip 110. Homologous clock signals refer to clock signals with the same frequency and phase. In addition, in the sensing chip 110, the clock circuits 111 is configured to output the same clock signals to be divided, the phase of the intermediate clock signal is the same as the phase of the input working clock signal, and the frequency of the working clock signal output by the dividing circuit 112 is the same as the frequency of the working clock signal input to the sensing chip 110, which can ensure that the working clock signal output by the next-stage sensing chip 110 under the sensing chip 110 and the working clock signal received by the sensing chip 110 are homologous clock signals.

Optionally, in another embodiment of the present disclosure, the chip branch 100 includes at least two types of sensing chips 110. The chip branch 100 includes at least two types of sensing chips 110, such as a sensing chip 110 with a single transmitter and a single receiver, or a sensing chip 110 with two transmitters and two receivers, or a sensing chip 110 with a single transmitter and two receivers.

In response to there being two types of sensing chips 110 included in the chip branch 100, the clock circuits 111 of each sensing chip 110 is configured to output the same or different clock signals to be divided. Optionally, in an embodiment of the present disclosure, the chip branch 100 includes two types of sensing chips 110, and the first stage sensing chip and the second stage sensing chip 110 are both sensing chips 110 with a single transmitter and a single receiver. The third-stage sensing chip 110 is a sensing chip 110 with two transmitters and two receivers, which is optional. The working clock signal received by the first level sensing chip 110 and the output working clock signal are homologous clock signals to meet the working requirements of the same type of second level sensing chip 110. The second-stage sensing chip 110 is designed to meet the working requirements of the third-stage sensing chip 110 with different types. The frequency and/or phase of the working clock signal output by the second stage sensing chip 110 to the third stage sensing chip 110 may be different from the working clock signal received by the second stage sensing chip 110. Therefore, in response to at least two types of sensing chips 110 being included in the chip branch 100, the clock circuit 111 of each sensing chip 110 is configured to output the same or different clock signals to be divided.

For the specific structure of the clock circuit 111, optionally, the clock circuit 111 includes a phase-locked loop, which can obtain stable and high-frequency clock signals after the working clock signal is integrated. Specifically, the phase-locked loop is configured to receive the working clock signal, process the working clock signal, and generate four phase clock signals. One of the four phase clock signals with the same phase as the working clock signal in the four phase clock signals is used as the intermediate clock signal, and the other three phase clock signals are used as backup clock signals.

Optionally, as an intermediate node, the sensing chip (or integrated circuit) serves as an intermediate node can be reused as the already integrated phase-locked loop of the main body to achieve clock synchronization between each sensing chip, or a phase-locked loop can be additionally set to achieve clock synchronization between each sensing chip, which can be set according to actual needs.

In addition, in response to a phase-locked loop being separately arranged to achieve clock synchronization between various sensing chips, the sensing chips at the end nodes of each cascaded branch do not need to output a reference clock for the next-stage sensing chip, and there is also no need to arrange a phase-locked loop structure and/or frequency dividing circuit for clock synchronization.

Moreover, for any sensing chip or integrated circuit provided with a clock circuit and a frequency dividing circuit, in the sensing chip or the integrated circuit, the clock circuit and frequency dividing circuit can be integrated into a phase-locked loop, that is, the frequency dividing circuit can be a frequency divider in the phase-locked loop, or a phase-locked loop can be used as a clock circuit, and a frequency divider can be used as the above frequency dividing circuit. That is, there is a frequency divider in the phase-locked loop that is used to implement the function of the phase-locked loop, while a frequency divider arranged outside the phase-locked loop can be used to divide the output of the phase-locked loop to obtain the output working clock signal.

In an optional embodiment, the phase-locked loop in the traditional sensing chip can be reused as the clock circuit, and a frequency divider can be added to receive the output of the reused phase-locked loop for frequency dividing to obtain the working clock of the next level sensing chip.

The phase difference between the four phase clock signals obtained by the phase-locked loop after the working clock signal is processed is 90 degrees. Generally, the phase of the working clock signals required by a sensing chip 110 and an upper stage sensing chip 110 is the same. Therefore, the phase-locked loop takes the one phase clock signal in the four phase clock signals that has the same phase as the working clock signal as the intermediate clock signal.

Figure 5:
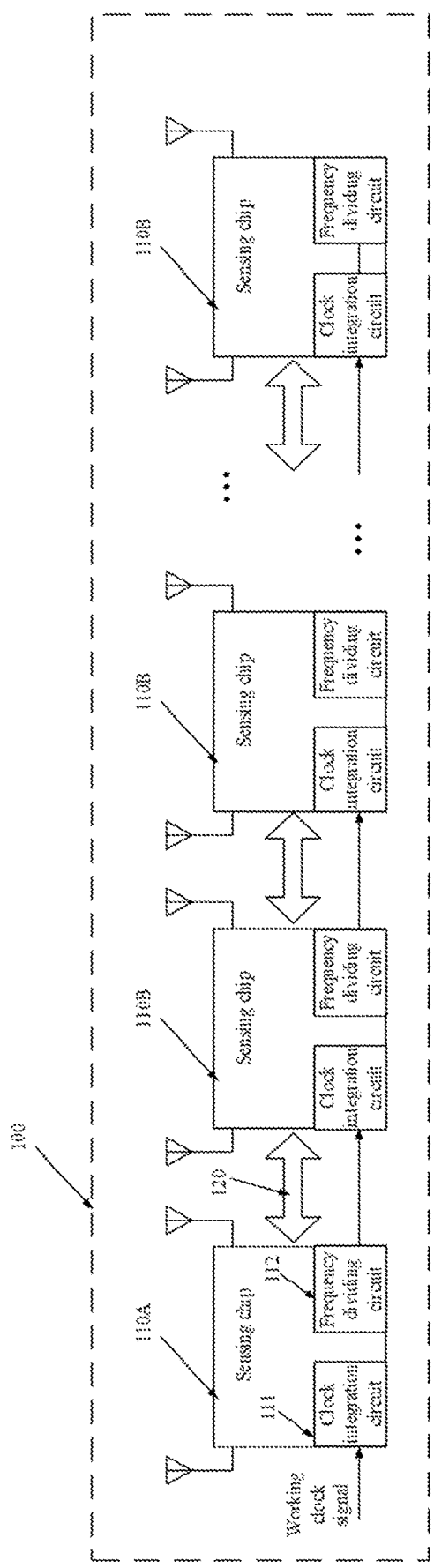
FIG. 5 is a schematic structural view of a sensing system provided according to still another embodiment of the present disclosure.

On the basis of the above embodiments, in an embodiment of the present disclosure, referring to FIG. 5, the chip branch 100 includes N sensing chips 110 including one master sensing chip 110A and at least one slave sensing chip 110B.

The master sensing chip 110A is configured to control the working status of each of the at least one slave sensing chip 110B, and the master sensing chip 110A is further configured to collect radar signals received by the at least one slave sensing chip 110B, summarize and process the radar signals, and transmit the processed radar signals outward.

Optionally, for the control function of the master sensing chip 110A on the at least one slave sensing chip 110B, the master sensing chip 110A is further configured to receive an enable signal, generate a control signal based on the enable signal, and transmit the control signal to the next-stage slave sensing chip 110B through the data channel 120.

Each of the at least one slave sensing chip 110B is further configured to receive the control signal, operate according to the control signal, and transmit the control signal to the next-stage slave sensing chip 110B through the data channel 120.

In an optional embodiment, the sensing chip 110 provided in the present disclosure embodiment further includes a digital function module and an operation control device. The digital function module is communicatively connected to the operation control device, the clock circuit 111, and the frequency dividing circuit 112, respectively.

The digital function module is configured to detect whether the clock circuit 111 and the frequency dividing circuit 112 are abnormal or not, and the operation control device is configured to control the digital function module to operate.

Specifically, the each of the N sensing chips 110 includes a digital circuit, a digital function module and an operation control device. The clock circuit 111 and the frequency dividing circuit 112 are part of the digital circuit. Various digital circuits are the basic structure of the sensing chip 110. Different digital circuits can realize different functions of the sensing chip 110. The digital function module is configured to detect whether each digital circuit works normally or not. The operation control device is configured to perform unified configuration management on the digital function module. The digital controller in the operation control device is configured to send control signals for function detection to the digital function module through the digital control interface. The configuration module is configured to store configuration information and status information, which can be obtained externally. The state machine is configured to control the workflow of each of the sensing chips 110, and read the configuration information stored in the configuration module, generate corresponding control signals for the control digital controller, and output the control signals to the digital function module to detect various digital circuits by the control digital function module.

The above sensing chip 110 uses a unified digital controller to connect to the digital function modules of the on-chip system through a digital control interface. After that, the configuration module and the state machine are used to achieve unified configuration management of the operation states of the digital function modules in the on-chip system, thereby improving the operational control efficiency of the on-chip system in the sensing chip 110.

Optionally, in an embodiment, the above sensing chip 110 is a millimeter wave sensing chip 110.

The frequency of the intermediate clock signal is greater than the frequency of the working clock signal. The types of digital function modules in the sensing chip 110 can be determined based on actual needs. For example, in the millimeter wave sensing chip 110, the digital function module may be a power detector, etc., which can be used to detect whether the voltage value of the antenna power amplifier is abnormal or not, and the operation control device can control the operation of the power detector.

Figure 6:
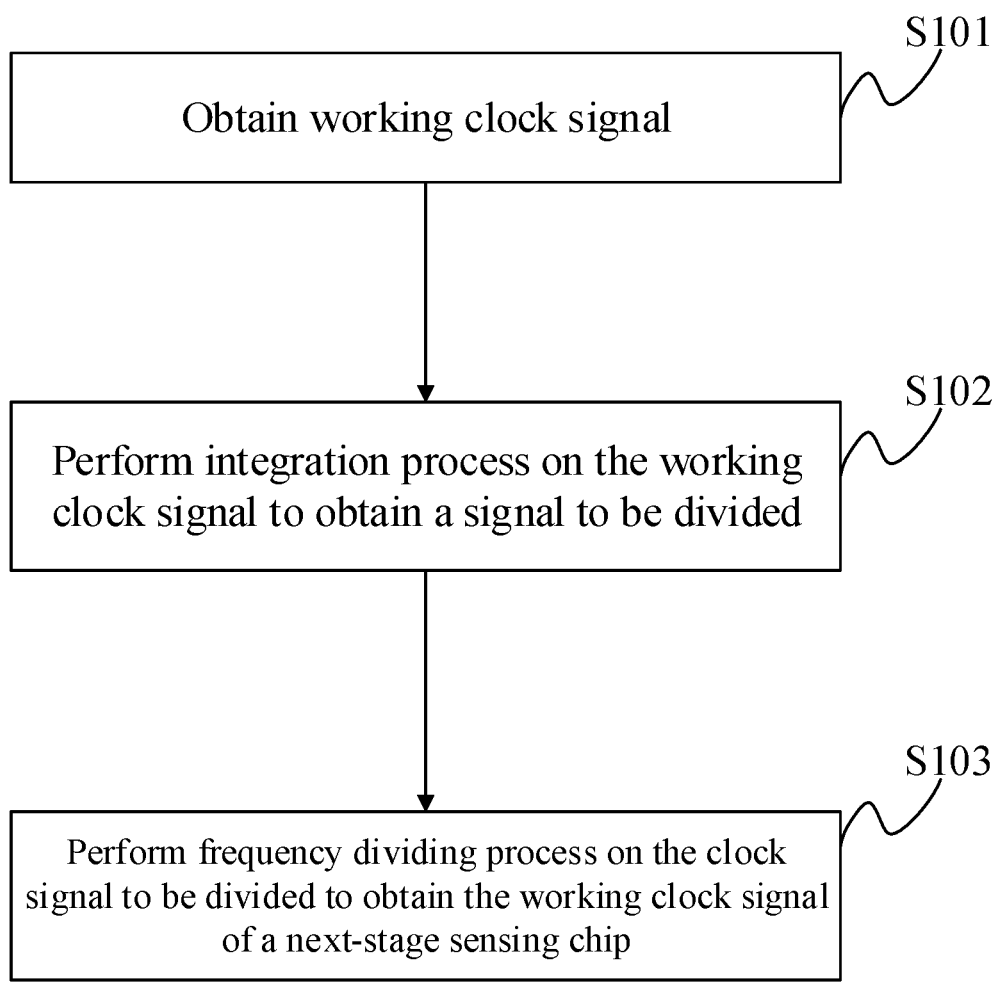
FIG. 6 is a flowchart of a method for obtaining a working clock signal provided according to an embodiment of the present disclosure.

Correspondingly, a method for obtaining a working clock signal is further provided according to the embodiments of the present disclosure, which is implemented based on the sensing system described in any of the above embodiments. The sensing system includes at least one chip branch 100 including N sensing chips 110 connected sequentially, with N greater than one, as shown in FIG. 6. The method for obtaining the working clock signal includes:

In operation S101, the working clock signal is obtained. The working clock signal received by the clock circuit 111 of the first stage sensing chip 110 includes an external working clock signal. The working clock signal received by the clock circuit 111 of the ith-stage sensing chip 110 is the working clock signal output by the frequency dividing circuit 112 of the i−1th-stage sensing chip 110, with i greater than 2.

In operation S102, the intermediate clock signal is obtained by performing an integration process on the working clock signal.

In operation S103, the output working clock signal is obtained by performing a frequency dividing processing on the intermediate clock signal.

In an embodiment, an integrated circuit for forming a cascaded branch is provided according to the present disclosure, and the integrated circuit includes a clock circuit and a frequency dividing circuit.

The clock circuit is configured to receive an input working clock signal, and to perform an integration process on the working clock signal to obtain an intermediate clock signal.

The frequency dividing circuit is configured to receive the intermediate clock signal, and to perform a frequency dividing process on the intermediate clock signal to obtain an output working clock signal.

The integrated circuit generally includes a digital circuit, a digital function module and an operation control device. The digital function module is communicatively connected to the digital circuit, respectively. The digital function module is configured to detect whether the digital circuit is abnormal or not, and the operation control device is configured to control the digital function module to operate.

In the integrated circuit, various digital circuits are the basic structure of the integrated circuit. The clock circuit and the frequency dividing circuit are both digital circuits. Different digital circuits can realize different functions of the integrated circuit (i.e., sensing chip 110). The digital function module is configured to detect whether each digital circuit works normally or not. The operation control device is configured to perform unified configuration management on the digital function module. The digital controller in the operation control device is configured to send control signals for function detection to the digital function module through the digital control interface. The configuration module is configured to store configuration information and status information, which can be obtained externally. The state machine is configured to control the workflow of each of the sensing chips 110, and read the configuration information stored in the configuration module, generate corresponding control signals for the control digital controller, and output the control signals to the digital function module to detect various digital circuits by the control digital function module.

The above integrated circuit adopts a unified digital controller to connect with the digital function module of the system on chip through a digital control interface. After that, the configuration module and the state machine are configured to achieve unified configuration management of the operation states of the digital function module in the system on chip, thereby improving the efficiency of the operation control of the system on chip in the integrated circuit.

The types of digital function modules in integrated circuits can be determined based on actual needs, such as power detectors, which can be configured to detect whether the voltage value of the antenna power amplifier is abnormal, and the operation control device is configured to control the operation of the power detector.

Optionally, the working clock signal received by the clock circuit of the first stage integrated circuit in the cascaded branch includes an external working clock signal.

The working clock signal received by the clock circuit of the ith-stage integrated circuit is the working clock signal output by the frequency dividing circuit of the i−1th-stage integrated circuit. Among them, i is an integer greater than one.

Optionally, the frequency dividing circuit is further configured to receive the intermediate clock signal, perform frequency dividing processing on the clock signal to obtain at least one frequency dividing clock signal for the integrated circuit to transmit and receive signals and/or signal processing and/or data processing.

Optionally, the integrated circuit includes a phase-locked loop, and the clock circuit and/or the frequency dividing circuit are integrated into the phase-locked loop.

It should be noted that the integrated circuit can integrate a phase-locked loop structure for its normal operation, and the phase-locked loop structure includes the clock circuit and/or frequency dividing circuit mentioned in the above embodiments of the present disclosure. In addition, the phase-locked loop structure can also be used as the clock circuit mentioned above, and a frequency dividing circuit can be added for frequency dividing processing of the intermediate clock signal output by the phase-locked loop structure. In addition, the clock circuit and the frequency dividing circuit can also be added to obtain the clock signal of the next stage integrated circuit, and the clock circuit and frequency dividing circuit can be two separate circuit modules, or can be an integrated circuit module with signal integration and frequency dividing processing, such as another added phase-locked loop structure.

Optionally, the integrated circuit is an AiP structure and/or an AoC structure.

In an optional embodiment, the integrated circuit can be equivalent to the sensing chip described in any above embodiment of the present disclosure, that is, the integrated circuit can have the same structure and function with the sensing chip, or can be combined with each other to form a cascade structure. For the sake of simplicity, it will not be repeated here, but it should be understood that technical solutions can be known by those of skills in the art based on the content recorded in the present disclosure shall fall within the scope of the present disclosure.

In an embodiment, a radio device is further provided according to the embodiments of the present disclosure, the radio device includes a carrier, a sensing system or an integrated circuit, where the sensing system is the sensing system according to any one of above embodiments, the integrated circuit is the integrated circuit according to any one of above embodiments, and the sensing system includes sensing chips 110 arranged on the carrier. The radio device further includes an antenna, and the antenna is arranged on the carrier or integrated with the sensing chip or the integrated circuit to be arranged on the carrier (i.e., the antenna may be the antenna arranged in the AiP structure or the AoC structure). The sensing chips 110 or the integrated circuit is connected to the antenna (i.e., the sensing chips 110 or the integrated circuit is not provided with any antenna, such as SoC). Among them, the carrier is a PCB, and the first transmission line is PCB wiring.

In an embodiment, a device is further provided according to the present disclosure, and the device includes a device main body, and a radio device, where the radio device is the radio device according to any one of above embodiments, and is arranged on the device main body. The radio device is configured to perform object detection and/or communication.

Specifically, on the basis of the above embodiments, in an embodiment of the present disclosure, the radio device is arranged outside the device main body. In another embodiment of the present disclosure, the radio device is arranged inside the device main body. In other embodiments of the present disclosure, the radio device may also be partially arranged inside the device main body and partially arranged outside the device main body, which will not be limited thereto the present disclosure, and may vary depending on the circumstances.

It should be noted that radio components can achieve functions such as target detection and communication by transmitting and receiving signals.

In an optional embodiment, the above device main body may be a component and a product applied in fields such as smart houses, transportation, smart homes, consumer electronics, monitoring, industrial automation, cabin detection, and healthcare. For example, the device main body may be an intelligent transportation device (e.g., a car, a bicycle, a motorcycle, a ship, a subway, a trains, etc.), a security device (e.g., a camera), a liquid level/flow rate detection device, an intelligent wearable device (e.g., a bracelet, a pair of glasses, etc.), a smart home device (e.g., a television, an air conditioner, a smart light, etc.), various communication devices (e.g., mobile phones, tablets, etc.), as well as devices such as road gates, intelligent traffic indicator lights, Intelligent signs, traffic cameras, and various industrial robotic arms (or robots) can also be used as various instruments for detecting vital feature parameters, as well as various devices equipped with such instruments. The radio device is the radio device described in any embodiment of the present disclosure. The structure and working principle of the radio device have been detailed in the above embodiments, and will not be elaborated here.

In summary, the embodiments of the present disclosure provide a sensing system, a method for obtaining a working clock signal, an integrated circuit, and a radio device. The sensing system includes at least one chip branch 100, and each of the at least one chip branch 100 includes N sensing chips 110 connected sequentially. In the chip branch 100, the clock circuit 111 of each of the N sensing chips 110 is configured to integrate the received working clock signal, to obtain a stable and relatively high frequency intermediate clock signal. The frequency dividing circuit 112 is configured to divide the clock signal to obtain the working clock signal required for the next-stage sensing chip 110. In the cascaded structure, the clock source only needs to provide the working clock signal of the first-stage sensing chip 110, which meets the driving requirements of the first-stage sensing chip 110. The working clock signal required by other sensing chips 110 is provided by an upper-stage sensing chip 110, which solves the problem of the number of sensing chips 110 connected in series in the chip branch being limited by the driving ability of the clock source, and expands the applicability of the sensing system.

Moreover, in the chip branch 100 of the sensing system, the placement and wiring of the connected sequentially sensing chips 110 are not limited by the location of the clock source, which is beneficial for improving the design flexibility of the sensing system and simplifying the difficulty of the sensor system layout.

The various technical features of the above embodiments can be combined arbitrarily. To make the description concise, all possible combinations of each technical feature in the above embodiments have not been described. However, as long as there is no contradiction in the combination of these technical features, all possible combinations should be considered within the scope of the present disclosure.

The above embodiments only express the preferred embodiments and technical principles of the present disclosure, and their descriptions are more specific and detailed. However, they cannot be understood as limitations on the scope of the present disclosure. For those skilled in the art, various obvious changes, adjustments, and substitutions may be made without departing from the scope of protection of the present disclosure. Therefore, although the present disclosure has been described in detail through the above embodiments, it is not limited to the above embodiments. Without departing from the concept of the present disclosure, more equivalent embodiments will be included, and the scope of protection of the present disclosure patent is determined by the scope of the appended set of claims.

What is claimed is:

1. A sensing system, comprising:
   at least one chip branch, wherein each of the at least one chip branch comprises N sensing chips connected sequentially to form N cascading stages, N being an integer greater than one;
   wherein each of the N sensing chips comprises a clock circuit and a frequency dividing circuit, the clock circuit is configured to receive an input working clock signal, and to increase a frequency of the input working clock signal by performing an integration process on the input working clock signal to obtain an intermediate clock signal;
   the frequency dividing circuit is configured to receive the intermediate clock signal, and to perform a frequency dividing process on the intermediate clock signal to obtain an output working clock signal;
   the input working clock signal received by the clock circuit of a first-stage sensing chip comprises a first working clock signal received by the at least one chip branch, the input working clock signal received by the clock circuit of an ith-stage sensing chip is the output working clock signal output by the frequency dividing circuit of an (i−1)th-stage sensing chip, i being an integer greater than one and less or equal to N.

2. The sensing system according to claim 1, wherein each of the at least one chip branch comprises one type of sensing chips;
   in each of the N sensing chips, the working clock signal output by the frequency dividing circuit and the working clock signal received by the clock circuit are homologous clock signals.

3. The sensing system according to claim 1, wherein each of the at least one chip branch comprises at least two types of sensing chips.

4. The sensing system according to claim 1, wherein in each of the at least one chip branch, a number of a jth-stage sensing chip is greater than or equal to 1.

5. The sensing system according to claim 1, wherein the clock circuit of each of the N sensing chips is configured to output a same intermediate clock signal or different clock signals to be divided.

6. The sensing system according to claim 1, wherein the clock circuit comprises a phase-locked loop.

7. The sensing system according to claim 6, wherein the phase-locked loop is configured to receive the working clock signal, process the working clock signal to generate four phase clock signals, determine one of the four phase clock signals with a same phase as the working clock signal as the intermediate clock signal, and determine the other three of the four phase clock signals as backup clock signals.

8. The sensing system according to claim 1, wherein the frequency dividing circuit is configured to continuously divide the intermediate clock signal from 1 to M to obtain multiple backup clocks with different frequencies, and determine the working clock signal output by the frequency dividing circuit from multiple backup clocks based on the clock signal frequency required by the next-stage sensing chip, M being an integer greater than 1.

9. The sensing system according to claim 1, wherein the N sensing chips of each of the at least one chip branch comprises one master sensing chip and at least one slave sensing chip.

10. The sensing system according to claim 9, wherein the master sensing chip is configured to receive an enable signal, generate a control signal based on the enable signal, and transmit the control signal to a next-stage slave sensing chip through a data channel;
wherein each of the at least one slave sensing chip is configured to receive the control signal, operate based on the control signal, and transmit the control signal to the next-stage slave sensing chip through the data channel.

11. The sensing system according to claim 1, wherein each of the N sensing chips further comprises: a power detector and a digital controller, the power detector is communicatively connected to the digital controller, the clock circuit, and the frequency dividing circuit, respectively;
the power detector is configured to detect whether the clock circuit and the frequency dividing circuit are abnormal or not, and the digital controller is configured to control operation of power detector.

12. The sensing system according to claim 1, wherein each of the N sensing chips is a millimeter wave sensing chip; and/or
the intermediate clock signal has greater frequency than the working clock signal.

13. A method for obtaining a working clock signal, implemented by the sensing system according to claim 1, the sensing system comprises at least one chip branch, wherein the at least one chip branch comprises N sensing chips connected sequentially, N being greater than one, and the method for obtaining the working clock signal comprises:
obtaining a working clock signal;
increasing a frequency of the working clock signal by performing integration process on the working clock signal to obtain an intermediate clock signal; and
performing frequency dividing process on the intermediate clock signal to obtain the output working clock signal.

14. A radio device, comprising:
a carrier;
the sensing system according to claim 1, wherein the N sensing chips are arranged on the carrier;
an antenna, wherein the antenna is arranged on the carrier or integrated with the N sensing chips to be arranged on the carrier;
wherein the N sensing chips are connected to the antenna to receive and transmit radio signals.

15. A device, comprising:
a device main body; and
a radio device, wherein the radio device is the radio device according to claim 14, and is arranged on the device main body;
wherein the radio device is configured to perform object detection and/or communication.

16. An integrated circuit, comprising a clock circuit and a frequency dividing circuit;
wherein the clock circuit is configured to receive an input working clock signal, and to increase a frequency of the input working clock signal by performing an integration process on the working clock signal to obtain an intermediate clock signal;
the frequency dividing circuit is configured to receive the intermediate clock signal, and to perform a frequency dividing process on the intermediate clock signal to obtain an output working clock signal;
the integrated circuit is configured to form a stage in a cascaded branch including N cascading stages, N being an integer greater than one;
the input working clock signal received by the clock circuit is a first working clock signal received by the cascaded branch when the integrated circuit forms a first-stage of the N cascading stages;
the input working clock signal received by the clock circuit is an output working clock signal output by an (i−1)th-stage when the integrated circuit forms an ith stage of the N cascading stages, i being an integer greater than one and less or equal to N.

17. The integrated circuit according to claim 16, wherein the working clock signal received by the clock circuit of a first stage of the integrated circuit in the cascaded branch comprises an external working clock signal; and
a working clock signal received by the clock circuit of an ith-stage of the integrated circuit is the working clock signal output by the frequency dividing circuit of an (i−1)th-stage of the integrated circuit, with i being greater than one.

18. The integrated circuit according to claim 17, wherein the frequency dividing circuit is further configured to receive the intermediate clock signal, and obtain at least one frequency dividing clock signal for the integrated circuit to transmit and receive signals and/or signal processing and/or data processing after the intermediate clock signal is divided in frequency.

19. The integrated circuit according to claim 16, wherein the integrated circuit comprises a phase-locked loop, and the clock circuit and/or the frequency dividing circuit are integrated into the phase-locked loop.

20. The integrated circuit according to claim 16, wherein the integrated circuit is an antenna in package (AiP) structure and/or an antenna on chip (AoC) structure.

* * * * *